(12) United States Patent
Yasuhara

(10) Patent No.: US 7,264,301 B2
(45) Date of Patent: Sep. 4, 2007

(54) FRONT STRUCTURE OF VEHICLE BODY

(75) Inventor: Shigeto Yasuhara, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 43 days.

(21) Appl. No.: 11/370,432

(22) Filed: Mar. 8, 2006

(65) Prior Publication Data
US 2006/0232104 A1 Oct. 19, 2006

(30) Foreign Application Priority Data
Apr. 15, 2005 (JP) ............................. 2005-117663

(51) Int. Cl.
B60J 7/00 (2006.01)
(52) U.S. Cl. ........................... 296/187.05; 296/203.02; 296/187.09
(58) Field of Classification Search ........... 296/187.05, 296/187.1, 187.03, 203.02, 193.09
See application file for complete search history.

(56) References Cited

U.S. PATENT DOCUMENTS

| | | | | |
|---|---|---|---|---|
| 2,297,123 A | * | 9/1942 | Almdale | 280/797 |
| 5,125,715 A | * | 6/1992 | Kijima | 296/187.09 |
| 5,370,438 A | * | 12/1994 | Mori et al. | 296/203.02 |
| 5,472,063 A | * | 12/1995 | Watanabe et al. | 296/187.09 |
| 6,099,194 A | * | 8/2000 | Durand | 296/204 |
| 6,857,691 B2 | * | 2/2005 | Kuroda et al. | 296/203.02 |
| 6,908,146 B2 | * | 6/2005 | Tomita | 296/187.09 |
| 6,929,314 B2 | * | 8/2005 | Hanyu | 296/203.02 |
| 7,097,235 B2 | * | 8/2006 | Yasukouchi et al. | 296/187.03 |
| 7,144,073 B2 | * | 12/2006 | Uchida | 296/203.02 |

FOREIGN PATENT DOCUMENTS

| | | |
|---|---|---|
| JP | 04-138949 | 5/1992 |
| JP | 2002-316666 | 10/2002 |
| JP | 2003-081129 | 3/2003 |
| JP | 2003-118640 | 4/2003 |

* cited by examiner

Primary Examiner—Kiran B. Patel
(74) Attorney, Agent, or Firm—Rankin, Hill, Porter & Clark LLP

(57) ABSTRACT

A front structure of a vehicle body having a pair of right and left front frames. Each front frame includes an axial load receiving member having first ridge lines extending substantially straight over the length thereof in the longitudinal direction of the vehicle body, and a moment receiving member welded to the axial load receiving member and having second ridge lines branched from substantially longitudinally central portions of the front ridge lines and curved inwardly of the vehicle body as extending rearwardly of the vehicle body.

1 Claim, 5 Drawing Sheets

FRONT STRUCTURE OF VEHICLE BODY

BACKGROUND OF THE INVENTION

1. Field of the Invention

The present invention relates to a front structure of an automotive vehicle body.

2. Description of the Related Art

A pair of right and left front frames (front side frames) as main components of a front structure of an automotive vehicle body as recently frequently used in the art are curved inwardly of the vehicle body as extending rearwardly of the vehicle body, so as to allow the steering movement of front wheels in turning the vehicle and to obtain a sufficient turning radius even when a large engine is mounted on the vehicle. As shown in FIG. 1 which is a plan view of such a front structure in the related art, a pair of right and left front frames 2 is curved inwardly of the vehicle body as extending rearwardly of the vehicle body, and they are integrally connected at their rear ends to right and left floor frames 4, respectively.

Reference numeral 6 denotes a dashboard for partitioning a front compartment 7 and a cabin. The front compartment 7 includes an engine/transmission mounting space 8 for mounting an engine and a transmission. Since the front frames 2 are curved inwardly of the vehicle body as extending rearwardly of the vehicle body, the steering movement of front wheels 10 does not interfere with the front frames 2 in turning the vehicle, thereby allowing good turning performance. Furthermore, even when a large engine is mounted on the vehicle, a sufficient turning radius can be obtained.

The structure of each front frame 2 curved inwardly as mentioned above will now be described with reference to FIGS. 2A and 2B. FIG. 2A is a plan view of each front frame 2, and FIG. 2B is a cross section taken along the line 2B-2B in FIG. 2A. Each front frame 2 is composed of a front frame body 2a curved inwardly of the vehicle body as extending rearwardly of the vehicle body, and a closed section forming plate 2b spot-welded to the front frame body 2a. As shown in FIG. 2A, the front frame 2 is curved inwardly by the distance L1. Such a front frame constitutes a main energy absorbing member for absorbing energy by axial crush deformation in receipt of a front collision input to the vehicle, and various structures of such a front frame and its surroundings have been proposed.

In the conventional structure shown in FIGS. 2A and 2B, the front frame 2 is curved inwardly of the vehicle body as extending rearwardly of the vehicle body. Accordingly, the front frame body 2a is required to have a sufficient plate thickness. Furthermore, when a front collision input shown by an arrow 12 is applied to the front frame 2, a bending moment 14 acts on the front frame 2, and an impact force upon front collision is transmitted along curved ridge lines as shown by an arrow 16. As a result, the front frame 2 is easy to deform upon front collision.

For example, Japanese Patent Laid-Open No. 2003-118640, Japanese Patent Laid-Open No. 2002-316666, or Japanese Patent No. 3610938 discloses a straight front frame extending in the longitudinal direction of a vehicle, and the above-mentioned problem of a curved front frame is not recognized at all in these patent documents. Further, Japanese Patent No. 2958091 is an invention mainly intended to prevent the deformation of a front frame, thereby maintaining the impact absorbing performance of the front frame, and the above-mentioned problem of a curved front frame is not recognized at all also in this patent documents.

SUMMARY OF THE INVENTION

It is therefore an object of the present invention to provide a front structure of a vehicle body which can reduce a bending moment generated at a curved portion of each front frame and can receive a front collision input as an axial load.

In accordance with an aspect of the present invention, there is provided a front structure of a vehicle body having a pair of right and left front frames, each of the front frames including an axial load receiving member having first ridge lines extending substantially straight over the length thereof in the longitudinal direction of the vehicle body; and a moment receiving member welded to the axial load receiving member and having second ridge lines branched from substantially longitudinally central portions of the front ridge lines and curved inwardly of the vehicle body as extending rearwardly of the vehicle body.

According to the present invention, the moment receiving member of each front frame is welded to the axial load receiving member, and the second ridge lines of the moment receiving member are curved inwardly of the vehicle body as extending rearwardly of the vehicle body. Accordingly, in turning the vehicle, the steering movement of the front wheels is not hindered by the front frames, and a sufficient turning radius can be obtained even when a large engine is mounted on the vehicle. Further, each front frame includes the axial load receiving member and the moment receiving member welded thereto. Accordingly, an impact force upon front collision of the vehicle can be received mainly by the axial load receiving member. As a result, each front frame is hard to deform upon front collision and can sufficiently absorb the impact upon front collision.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

There will now be described a front structure of a vehicle body according to a preferred embodiment of the present invention with reference to FIGS. 3A to 5.

Figure 1:
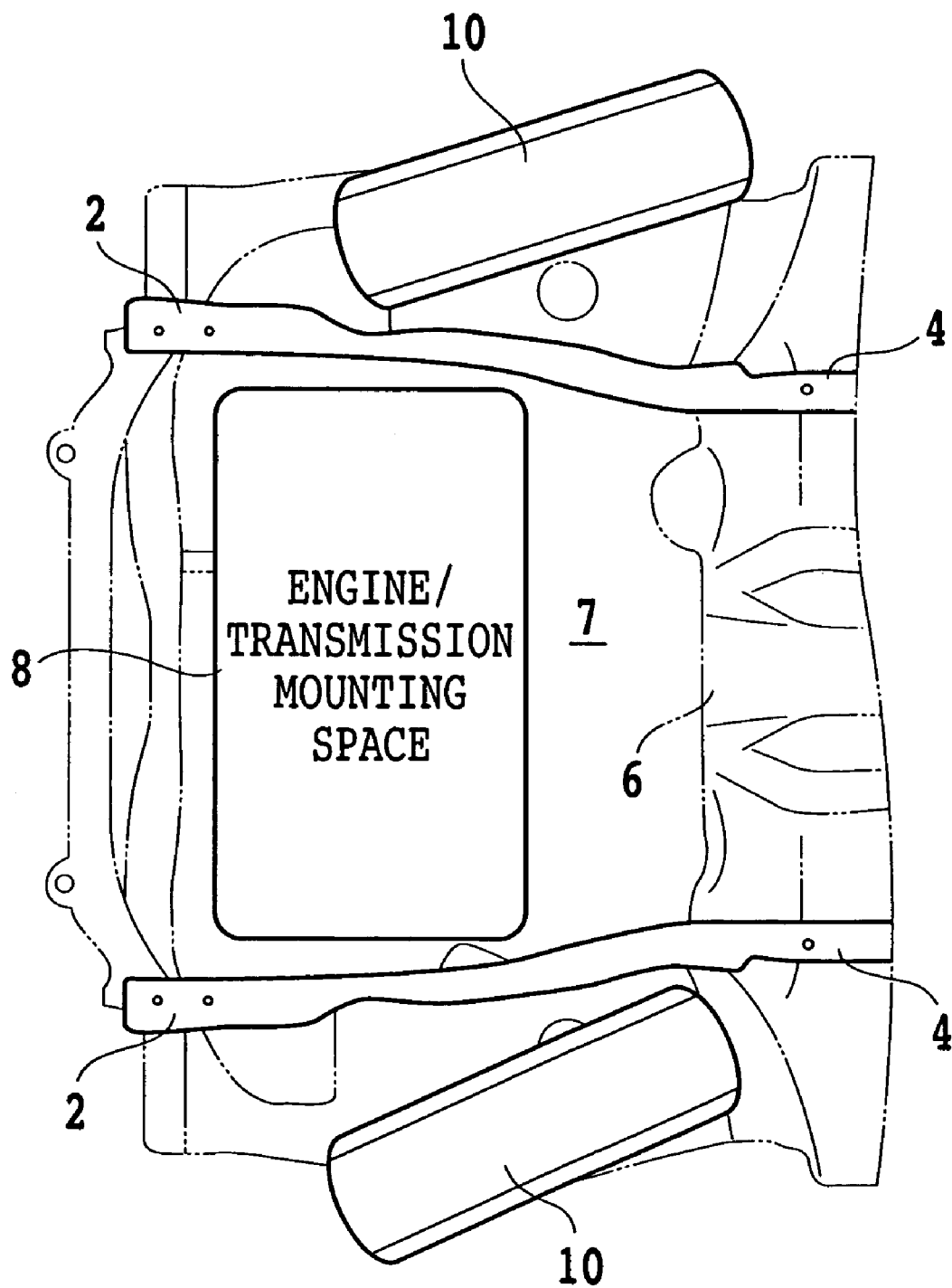
FIG. 1 is a bottom plan view schematically showing a front structure of a vehicle body in the related art.
Figure 2A:
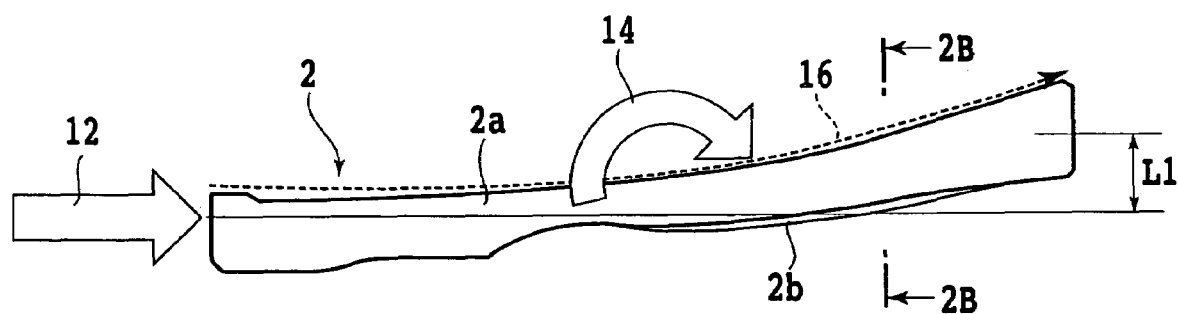
FIG. 2A is a plan view of a front frame in the related art.
Figure 2B:
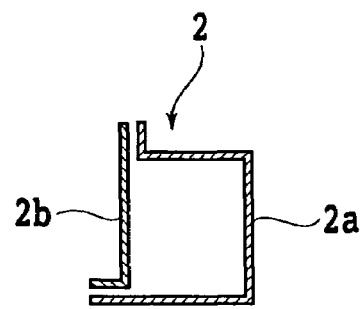
FIG. 2B is a cross section taken along the line 2B-2B in FIG. 2A.
Figure 3A:
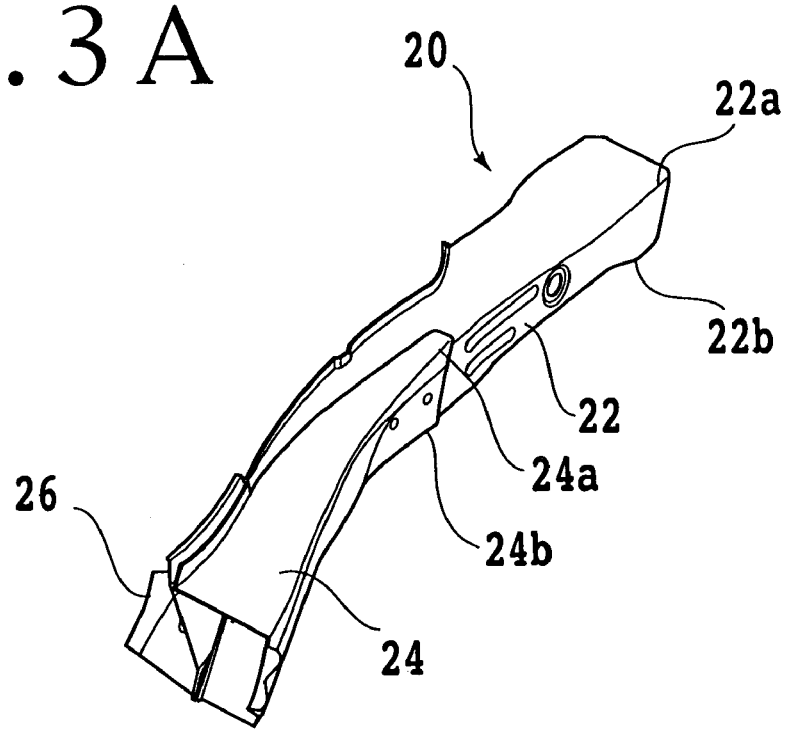
FIG. 3A is a perspective view of a front frame according to a preferred embodiment of the present invention.
Figure 3B:
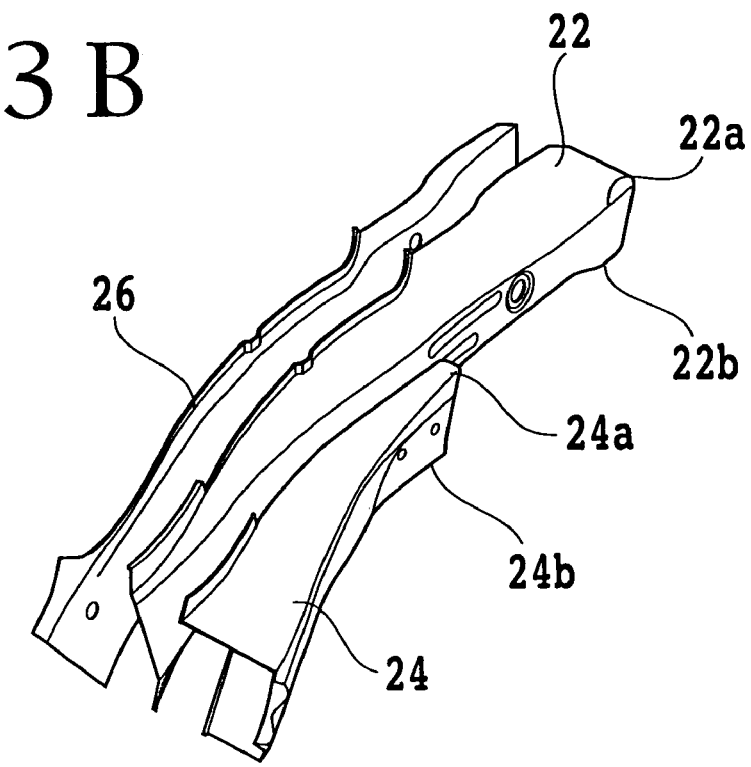
FIG. 3B is an exploded perspective view of the front frame shown in FIG. 3A.
Figure 4A:
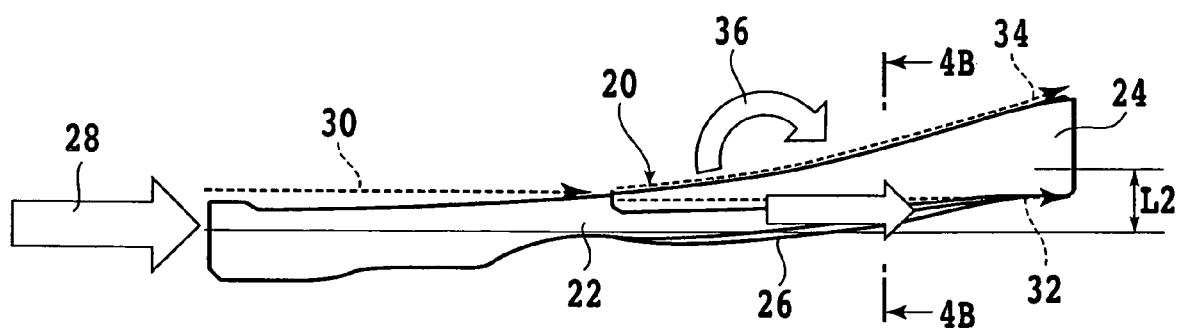
FIG. 4A is a plan view of the front frame according to the preferred embodiment.

FIG. 3A is a perspective view of a front frame 20 according to the preferred embodiment, and FIG. 3B is an exploded perspective view of the front frame 20 shown in FIG. 3A. FIG. 4A is a plan view of the front frame 20 according to the preferred embodiment, FIG. 4B is a cross section taken along the line 4B-4B in FIG. 4A, and FIG. 5 is an exploded plan view of the front frame 20 shown in FIG. 4A.

The front frame 20 is composed of an axial load receiving member 22 having ridge lines (first ridge lines) 22a and 22b extending substantially straight over the length thereof in the longitudinal direction of the vehicle body, a moment receiving member 24 welded to the axial load receiving member 22 and having ridge lines (second ridge lines) 24a and 24b branched from substantially longitudinally central portions of the ridge lines 22a and 22b of the axial load receiving member 22 and curved inwardly of the vehicle body as extending rearwardly of the vehicle body, and a closed section forming plate 26 welded to the axial load receiving member 22 opposite to the moment receiving member 24 for forming a closed section.

Figure 4B:
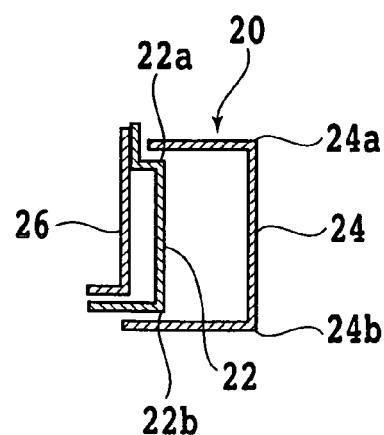
FIG. 4B is a cross section taken along the line 4B-4B in FIG. 4A.

The front frame 20 has a sectional shape as shown in FIG. 4B. The moment receiving member 24 is spot-welded to the axial load receiving member 22 at plural positions, and the closed section forming plate 26 is spot-welded to the axial load receiving member 22 opposite to the moment receiving member 24 at plural positions, thus forming a closed section.

Figure 5:
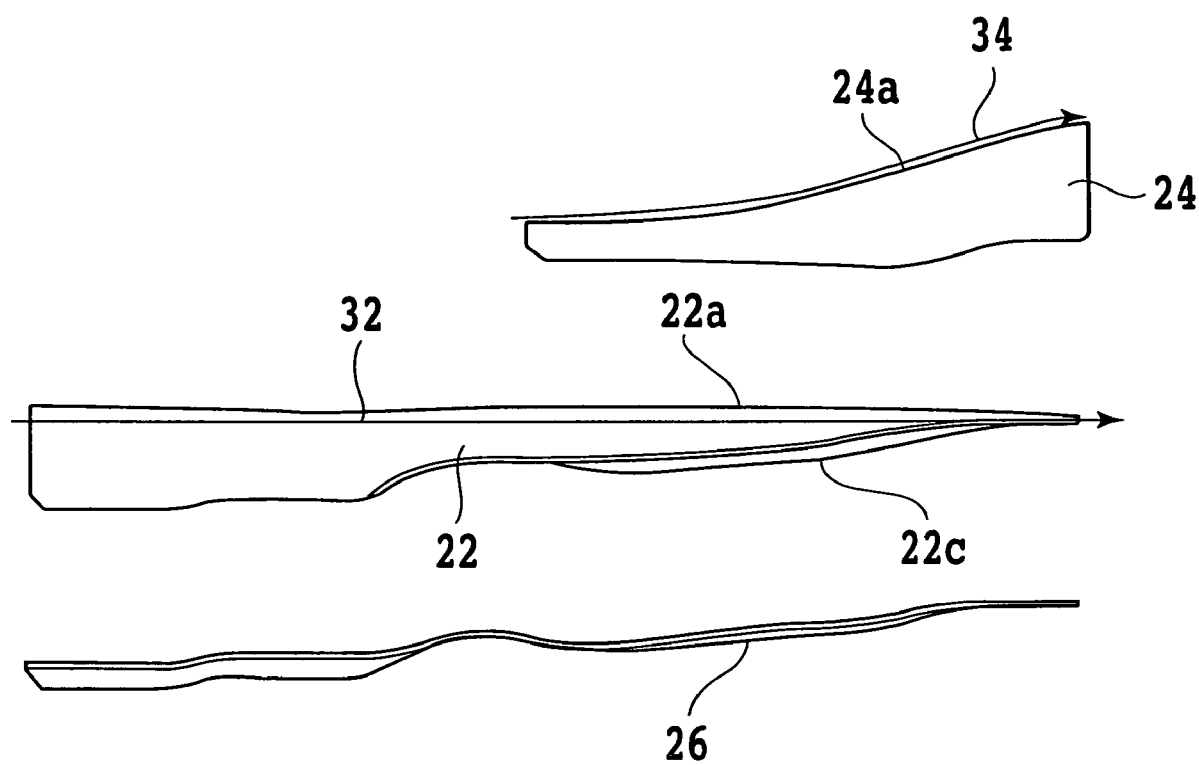
FIG. 5 is an exploded plan view of the front frame shown in FIG. 4A.

As apparent from FIG. 5, the ridge lines 22a and 22b of the axial load receiving member 22 extend substantially straight over the length thereof in the longitudinal direction of the vehicle body, and the axial load receiving member 22 further has a pair of outside edges 22c defining an outside opening of the axial load receiving member 22. These outside edges 22c are tapered toward the rear end of the axial load receiving member 22. The ridge lines 24a and 24b of the moment receiving member 24 are curved inwardly of the vehicle body as extending rearwardly of the vehicle body. Accordingly, in the assembled condition of the front frame 20 by spot welding of the components 22, 24, and 26, the front frame 20 is curved inwardly of the vehicle body by the distance L2 shown in FIG. 4A.

Accordingly, a front collision input 28 is received as an axial load mainly by the ridge lines 22a and 22b of the axial load receiving member 22 as shown by straight arrows 30 and 32, and a bending moment 36 due to the curve of the front frame 20 is received by the ridge lines 24a and 24b of the moment receiving member 24 spot-welded to the axial load receiving member 22 as shown by a curved arrow 34. As a result, the bending moment 36 does not act on the axial load receiving member 22 upon front collision, so that the front frame 20 is hard to deform upon front collision and can sufficiently absorb the impact upon front collision.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A front structure of a vehicle body having a pair of right and left front frames, each of said front frames comprising:
   an axial load receiving member having first ridge lines extending substantially straight over the length in the longitudinal direction of said vehicle body; and
   a moment receiving member welded to said axial load receiving member and having second ridge lines branched from substantially longitudinally central portions of said first ridge lines and curved inwardly of said vehicle body as extending rearwardly of said vehicle body.

* * * * *